W. HUBER.
DISTRIBUTER FOR SAND OR THE LIKE.
APPLICATION FILED AUG. 24, 1910.
1,000,004.
Patented Aug. 8, 1911.
2 SHEETS—SHEET 1.
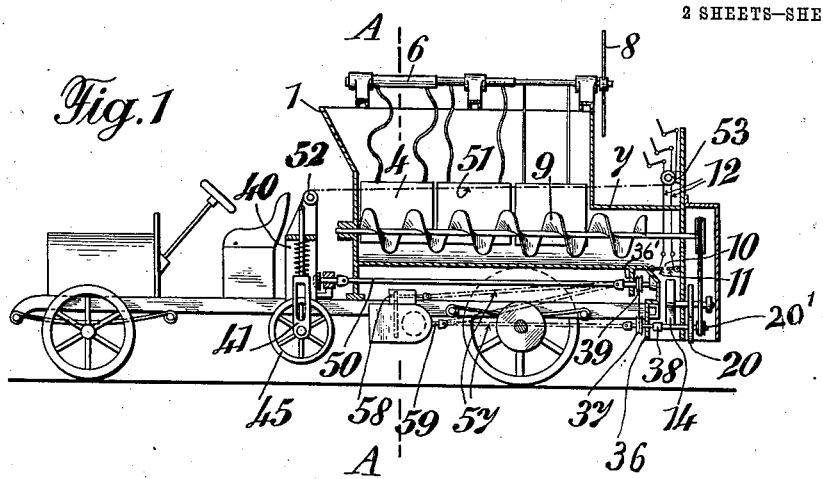
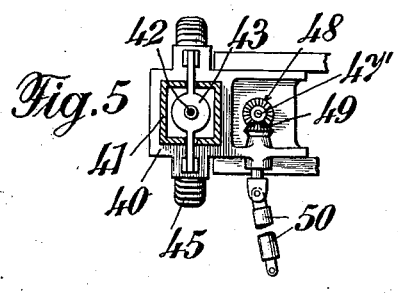
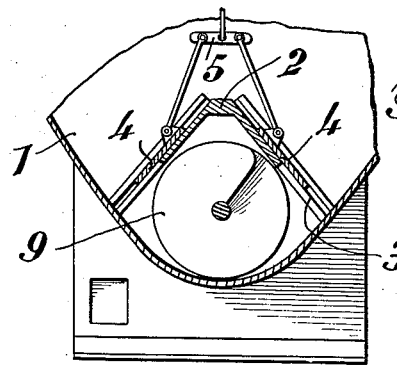
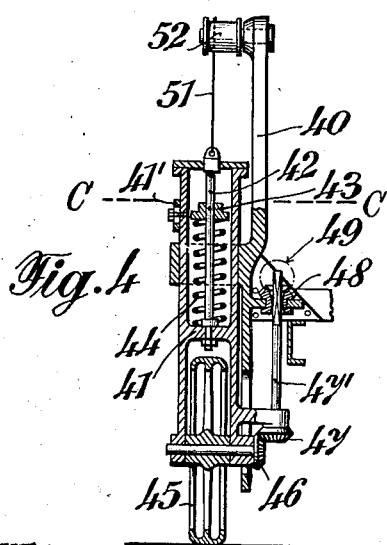
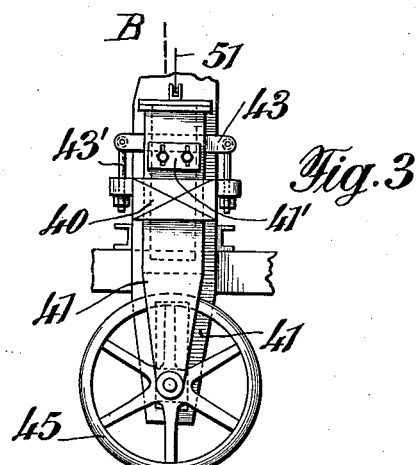
Witnesses
Inventor:
Werner Huber.

W. HUBER.
DISTRIBUTER FOR SAND OR THE LIKE.
APPLICATION FILED AUG. 24, 1910.

1,000,004.

Patented Aug. 8, 1911.
2 SHEETS—SHEET 2.

Witnesses:
B. Sommers
May Ellis

Inventor:
Werner Huber,
By Henry Orth
Att.

UNITED STATES PATENT OFFICE.

WERNER HUBER, OF SIHLBRUGG, SWITZERLAND.

DISTRIBUTER FOR SAND OR THE LIKE.

1,000,004. Specification of Letters Patent. Patented Aug. 8, 1911.

Application filed August 24, 1910. Serial No. 578,695.

*To all whom it may concern:*

Be it known that I, WERNER HUBER, a citizen of the Republic of Switzerland, residing at Sihlbrugg, Switzerland, have invented certain new and useful Improvements in Distributers for Sand or the Like; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of my invention is an improved distributer for sand, gravel, seed or other material, whereby it is scattered in a plane lying at right angles to the direction of travel of the vehicle on which the distributer is mounted, instead of being distributed as heretofore at merely an angle to the ground. When the distributer, mounted on a cart, is employed for instance for sanding busy streets, no obstruction is caused, since foot-passengers and vehicles or the like, whether in front or behind the cart are not struck by the sand, and the material which is thrown in a lateral direction can be readily deflected by adjustable flaps or the like, which enable the distribution to be interrupted without the distributer having to be stopped.

The distributer may consist for example of two distributing-wheels, which rotate in the direction toward each other, from above downward, in a plane located substantially at right-angles to the direction of travel. Friction-gearing is provided for transmitting to the distributing-wheels the motion of devices on the vehicle-frame, set in operation by the advance of the cart, and by means of this gearing the velocity of rotation of the distributing-wheels can be altered quite independently of the speed of travel of the cart. This can be done, for instance, by connecting the shafts of the distributing-wheels by a crossed belt, and by mounting a friction-wheel on each shaft, each wheel, independently of the other one, being capable of being brought into engagement with a friction-wheel mounted on an auxiliary shaft set in rotation by the cart as it travels along the road.

One embodiment of the invention is illustrated in the accompanying drawings.

Figure 6:
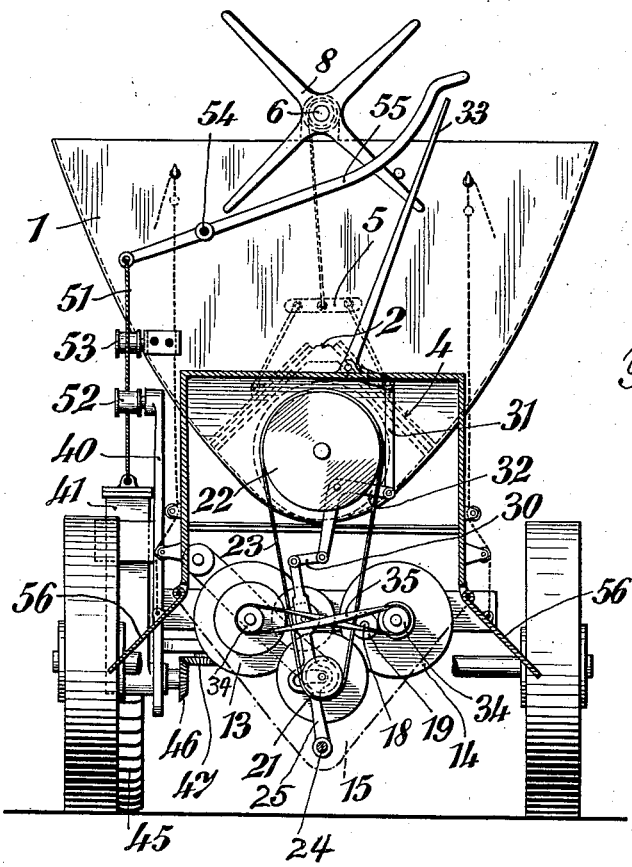
Figure 7:
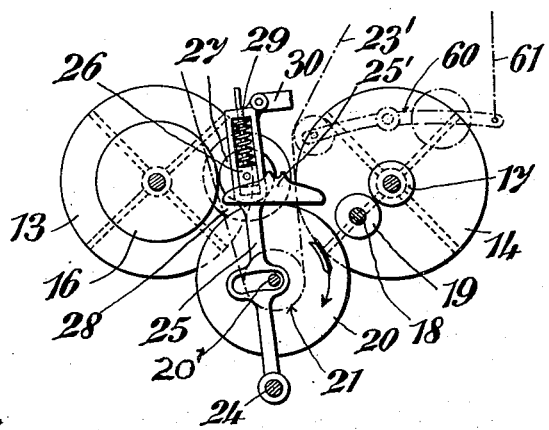

Figure 1 is a side elevation of a motor-car and a longitudinal vertical section of a sand distributer mounted thereon. Fig. 2 is an enlarged detail cross section on line A—A of Fig. 1. Fig. 3 is a side elevation of the wheel, and its holder, for driving the distributer mechanism. Fig. 4 is a vertical section on line B—B of Fig. 3. Fig. 5 is a cross section on line C—C of Fig. 4. Fig. 6 is a rear elevation and part section of the distributer. Fig. 7 shows the feed wheels and certain coöperating mechanism, drawn on a larger scale.

1 designates a trough or hopper-shaped receptacle for the sand or other material to be distributed, divided by a roof-like partition 2 into an upper and a lower compartment. The sides of the partition 2 present each three openings 3, closable by slides 4. The slides on the two sides are connected in pairs to two cross-bars 5.

6 designates a stepped shaft mounted at the top of the receptacle 1, and with this shaft the cross-bars 5 are connected by means of steel cords or the like. The cross-bars of the rear pair of slides are connected with the thin part of the shaft 6, and those of the front pair of slides with the thick part thereof, while those of the central pair of slides are connected with the middle part of the shaft. The steel cords of each preceding pair of slides are longer than those of the succeeding pair, corresponding with the diameter of the shaft, so that on rotation of the shaft 6 by means of a spider wheel 8, located above the operator's platform 7, the pairs of slides can be elevated in succession from the rear forward.

In the bottom compartment of the hopper 1 there is mounted a screw-conveyer 9, and at the back of this compartment there is an exit 10, closable by means of two flaps or shutters 11, each of which can be operated separately by means of lever mechanism 12, located at the operator's platform. Below the exit 10 two feed-wheels 13, 14 are mounted in a bearing-bracket 15 secured to the casing. On the shaft of the feed-wheel 13 (Figs. 6 and 7) there is mounted a friction-wheel 16, and on the shaft of the feed-wheel 14 there is a friction-wheel 17, while on a separate shaft 18 there is mounted an intermediate friction-wheel 19, which is in engagement with the wheel 17. Beneath the pair of feed-wheels, and in the same plane as the friction-wheel 16, there is mounted a friction-wheel 20, on the shaft 20' of which there is also a belt pulley 21.

23 designates a strap passed around the pulley 21 and a pulley 22 mounted on the conveyer-shaft.

25 designates a lever fulcrumed to a fixed pin 24 projecting from the bearing-bracket 15. The lever 25 is slotted and receives the sliding bearing-block 26 of the shaft of a pair of intermediate wheels 27, 28. Acting on the bearing 26 inside the slot of the lever 25, there is a helical spring 29 which depresses the wheels 27, 28; and since the wheel 27 lies in the same plane as the wheel 20, the wheel 27 will be forced against the latter, provided that there is nothing to obstruct shifting of the wheels 27, 28. The lever 25 is connected by the rods 30, 31 and bent lever 32 with a control lever 33, accessible from the operator's platform. By throwing over the lever 33, the lever 25 can be turned from the one end-position, in which the wheels 20, 27 and 16 are in engagement into the other end-position, in which the wheels 28 and 19 engage. On the shafts of the feed-wheels 13, 14 there are mounted belt-pulleys 34, 34, over which there runs a crossed belt 35.

25' designates a stationary member, having an elevated rest, which lies in the path of the bearing-block 26 and the purpose of said stationary member is to lift the wheel 27 from the wheel 20 when the control-lever 33 is in its central position.

In a bearing-bracket 36 (Fig. 1) secured to the hopper 1, is journaled the shaft of a chain-pulley 37. The shafts of the two members 20, 37 are connected by a universal articulated coupling 38. The shaft of the pulley 37 has on its front end the one half of an articulated coupling. Above the pulley 37 there is a second chain-pulley 39, mounted on a shaft journaled in the bracket 36' and this latter shaft also has at its front end the one half of an articulated coupling. A chain runs over the two pulleys 37, 39.

The above described mechanism is employed in connection with the device shown in Figs. 3–5. This latter consists of a guide 40, in which there slides in vertical direction a holder 41. This holder has an upper box-shaped part, through which there extends a vertical rod 42 and a transverse bar 43, which latter passes through slots in the walls of the holder. Between the bar 43 and the base of the top part there is a helical spring 44, coiled around the rod 42. The bottom part of the holder 41 is forked and there is journaled on it a wheel 45 having a ribbed felly. On the axle of this wheel there is mounted a bevel-gear 46, with which there meshes a second bevel-gear 47, the shaft of which is secured to the holder. To the shaft of the gear 47 there is jointed a vertical shaft 47', the upper end of which is of hexagonal form in cross-section. This end passes through the wheel 48 of miter-wheel gearing 48, 49 secured to the guide 40. The central portion of the box of the hub of the wheel 48 is of the section of the shaft end, while toward the ends it is larger than the shaft. In this manner the wear and tear of the guide will not prejudicially effect the transmission gearing, and jamming of the parts is avoided. The shaft of the wheel 49 carries the one half of an articulated coupling, to which the coupling-half on the adjacent ends of a rod 50 fits (Fig. 5). The coupling-half at the other end of this rod fits the coupling-half of the chain-gear 39.

The above described distributer is so constructed that it can be fastened to a vehicle, with capability of detachment, for instance for scattering sand or other material over frozen, wet or slippery thoroughfares. In the case of the motor-car shown in Fig. 1, the central part of the vehicle is removed and in its place the sand-hopper with conveying, distributing and transmission mechanisms, is bolted to the car-frame. Hereupon the operating mechanism is laterally fixed by means of the guide 40, and the miter-gearing 48, 49 with the chain-gearing 39 connected by means of the rod 50, and finally a cord 51 secured to the rod 42 of the holder 41, and passed around a roller 52 mounted on the guide and around another roller 53 mounted on the hopper and attached to one end of the lever 55 (Fig. 6) fulcrumed on the pivot 54 at the rear wall of the platform.

When it is desired to use the apparatus the slides 4 and the shutters 11 are closed, the control lever 33 set in its central position, the wheel 45 raised from the ground by throwing over the lever 55, sand or other material filled into the hopper, and the vehicle driven to the place of work. To commence sanding, the operator opens the shutters 11 by means of the lever mechanism 12, and releases the lever 55, whereby the operating wheel 45 will run upon the ground, so that the driving-wheel 20 will rotate in the direction of the arrow. Depending upon the speed of the car the operator will throw over the control lever 25 into one of its end positions, right or left. The wheel 27 now comes into engagement with the wheel 20, and, accordingly as the lever 25 has been operated, the shaft of one of the feed-wheels 13 or 14 will be driven, and the motion will be transmitted to the other feed-wheel by the crossed belt 35. The gearing is such that in both cases the feed-wheels rotate toward each other, from above downward. When the feed-wheels are thus rotating the operator opens the slides 4 by slowly turning the spider 8, the extent of opening depending upon the speed at which the cart is traveling and the quantity of sand or other material to be distributed. Owing to the already described form of the shaft 6 and arrangement of the slides 4, sudden opening of the latter is avoided, so that the conveyer 9 will be loaded quite gradually. The sand transported by the conveyer will drop through the exit 10, between the blades of the wheels 13, 14 and will be scattered downwardly and laterally by the latter. In order that the distance to which the sand is thrown may be regulated, hinged deflecting-flaps 56 are provided at both sides of the distributing-wheels 13, 14.

When the car is driven at a rapid speed, the simple-geared transmission will suffice to impart the necessary peripheral velocity to the feed-wheels for thorough distribution of the sand. If, however, the car is driven slowly, the multiple-geared transmission must be employed to insure the requisite velocity. For this purpose the diameter of the wheels 27, 28, 19 and 17 are calculated for slow speed and that of the wheel 27 for high speed.

The pressure of the operating-wheel 45 on the road can be adjusted by bolts 43' (Fig. 3), which connect the cross-bar 43 with the guide 40. The downward motion of the wheel-holder 41 can be regulated by a vertically adjustable stop 41' screwed to it.

For cases in which transmission of motion by means of the mechanism shown in Figs. 3 to 5 is not desired, rod-gear 57 is provided for the purpose of coupling with the chain pulley 39, wheel-gearing 58, which is mounted on the differential-gear casing and engages with the shaft that drives the latter gear; or of connecting a gear 59, which engages directly with a differential wheel, with the chain pulleys 37, 39. In order that in these cases also the conveyer 9 may be stopped while the cart is being driven, the belt 23' which transmits the motion of the shaft 20' to the conveyer shaft is kept slack and furnished with a tightening-device 60, which is actuated by means of a cord 61 from the operator's platform (see broken lines in Fig. 7).

Such removable distributers can be fitted on various classes of vehicles, whether motor- or horse-driven, and the distributing-mechanism can be actuated automatically by coupling the driving-gear of the said mechanism with the operating-gear (40—49) on the vehicle, or with other moving parts on the vehicle (driving mechanism, wheels, shafts, etc.)

Having now particularly described and ascertained the nature of the said invention and in what manner the same is to be performed, I declare that what I claim is:

1. An apparatus for carrying and distributing sand and like material comprising a vehicle, a hopper mounted thereon, a conveyer fed from the hopper, rotatable scattering members supplied by the conveyer, a vertically adjustable operating wheel mounted on the vehicle, multiple gearing connected with the scattering members, and driving mechanism connecting the operating wheel with the multiple gearing.

2. An apparatus for carrying and distributing sand and like material comprising a vehicle, a hopper mounted thereon, a conveyer fed from the hopper, means to regulate the quantity of material fed from the hopper to the conveyer, rotatable scattering members supplied by the conveyer, a vertically adjustable operating wheel mounted on the vehicle, multiple gearing connected with the scattering members, and driving mechanism connecting the operating wheel with the multiple gearing.

3. An apparatus for distributing sand and like material comprising a vehicle, a hopper mounted thereon, two feed wheels mounted in a common plane below the hopper and supplied with material from the hopper, a vertically adjustable operating-wheel mounted on the vehicle, multiple friction gears, means for coupling the latter with the axle of operating wheel, and means for coupling the feed wheels with either of the friction gears.

4. An apparatus for distributing sand and like material comprising a vehicle, a hopper mounted thereon, two feed wheels mounted in the same vertical plane and supplied with material from the hopper, a cross flexible member connecting the wheels, a main friction wheel mounted on the shaft on each feed-wheel, an auxiliary friction-wheel engaging one of the main friction wheels, an oscillatory shaft, a pair of intermediate friction wheels journaled in the latter, one of the intermediate wheels adapted to engage one of the main friction wheels and the other intermediate wheel adapted to engage the auxiliary friction wheel, and a driving friction wheel adapted to be engaged by one of said intermediate wheels.

5. An apparatus for distributing sand and like material comprising a vehicle, a hopper mounted thereon, two feed wheels mounted in the same vertical plane and supplied with material from the hopper, a cross flexible member connecting the wheels, a main friction wheel mounted on the shaft on each feed-wheel, an auxiliary friction-wheel engaging one of the main friction wheels, an oscillatory shaft, a pair of spring urged intermediate friction wheels journaled in the latter, one of the intermediate wheels adapted to engage one of the main friction wheels and the other intermediate wheel adapted to engage the auxiliary friction wheel, and a driving friction wheel adapted to be engaged by one of said intermediate wheels simultaneously with the engagement of the latter with the auxiliary friction wheel.

6. An apparatus for distributing sand and like material comprising a vehicle, a hopper mounted thereon, two feed-wheels mounted in the same vertical plane and supplied with material from the hopper, a cross flexible member connecting the wheels, a main friction wheel mounted on the shaft on each feed-wheel, an auxiliary friction-wheel, engaging one of the main friction wheels, a driving friction wheel, a road wheel coupled with the latter, a pivoted lever, and a pair of intermediate friction wheels journaled on the lever, one of said intermediate wheels adapted to engage one of the main friction wheels and the other intermediate wheel adapted to engage the auxiliary friction wheels.

7. An apparatus for distributing sand and like material comprising a vehicle, a hopper mounted thereon, two feed-wheels mounted in the same vertical plane and supplied with material from the hopper, a cross flexible member connecting the wheels, a main friction wheel mounted on the shaft of each feed-wheel, an auxiliary friction-wheel engaging one of the main friction wheels, a driving friction wheel, a road wheel coupled with the latter, a pivoted lever, a pair of spring controlled intermediate friction wheels journaled on the lever, one of said intermediate wheels adapted to engage one of the main friction wheels and the other intermediate wheel adapted to engage the auxiliary friction wheel and means coöperating with the lever to overcome the action of the spring which controls the intermediate friction wheels.

8. An apparatus for distributing sand and like material comprising a portable hopper, feed wheels, means to transfer the material from the hopper to the feed wheels, a vertically adjustable spring-controlled holder connected with the hopper, a road-wheel journaled in the holder, means for raising and lowering the holder, and means for transmitting the motion of the road-wheel to the feed-wheels.

9. An apparatus for distributing sand and like material comprising a hopper, partitions dividing the same into an upper and a lower compartment which communicate through openings in the partition, slides closing said openings, a shaft varying in diameter mounted above the partition, and flexible members connecting the slides with the shaft, said flexible members varying in length, for the purpose specified.

10. An apparatus for distributing sand and like material comprising a hopper, partitions dividing the same into an upper and a lower compartment which communicate through openings in the partition, slides closing said openings, a shaft varying in diameter mounted above the partition and flexible members connecting the slides and shaft, the flexible members which connect the slides with the shaft at its smallest diameter being shorter than the flexible members which connect the slides with the shaft at its largest diameter.

In testimony that I claim the foregoing as my invention, I have signed my name in presence of two subscribing witnesses.

WERNER HUBER.

Witnesses:
HERBERT D. JAMESON,
R. WILSON.